(12) United States Patent
Hirata et al.

(10) Patent No.: US 9,374,818 B2
(45) Date of Patent: Jun. 21, 2016

(54) RECEIVER, COMMUNICATION SYSTEM AND IN-STORE EQUIPMENT MONITORING SYSTEM

(75) Inventors: Yuuki Hirata, Moriguchi (JP); Kazuaki Okamoto, Moriguchi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 122 days.

(21) Appl. No.: 14/008,851

(22) PCT Filed: Dec. 15, 2011

(86) PCT No.: PCT/JP2011/079078
§ 371 (c)(1),
(2), (4) Date: Sep. 30, 2013

(87) PCT Pub. No.: WO2012/132133
PCT Pub. Date: Oct. 4, 2012

(65) Prior Publication Data
US 2014/0029587 A1    Jan. 30, 2014

(30) Foreign Application Priority Data
Mar. 31, 2011   (JP) .................................. 2011-080863

(51) Int. Cl.
*H04J 3/00* (2006.01)
*H04W 72/04* (2009.01)
*H04L 5/00* (2006.01)
(Continued)

(52) U.S. Cl.
CPC ......... *H04W 72/0446* (2013.01); *H04L 1/1671* (2013.01); *H04L 1/1854* (2013.01); *H04L 1/1864* (2013.01); *H04L 1/1887* (2013.01);
(Continued)

(58) Field of Classification Search
USPC ........... 370/230–338, 389–410; 709/204–229
See application file for complete search history.

(56) References Cited

U.S. PATENT DOCUMENTS 6,594,247 B2 *   7/2003   Perkins et al. ................. 370/341
7,079,480 B2 *   7/2006   Agee ............................. 370/204
(Continued)

FOREIGN PATENT DOCUMENTS

CN         101536391 A       9/2009
JP        2008-092378 A       4/2008
(Continued)

OTHER PUBLICATIONS

International Search Report in PCT/JP2011/079078 dated Mar. 6, 2012 with English Translation.
(Continued)

*Primary Examiner* — Man Phan
(74) *Attorney, Agent, or Firm* — McDermott Will & Emery LLP

(57) ABSTRACT

To avoid occurrence of communication conflict at the transmission time of re-transmission data without losing real-time performance of data transmission with respect to data missing during communication, thereby enabling excellent data transmission a reception controller allocates time slots for transmission of second data (re-transmission) transmitted from transmitters on the basis of a re-transmission request message according to a reception condition of first data (latest data) and the reception controller transmits an acknowledgement message (ACK) for the first data with a slot time being embedded in an acknowledgement message for every reception-success transmitter.

6 Claims, 5 Drawing Sheets

(51) Int. Cl.
*H04L 1/16* (2006.01)
*H04L 1/18* (2006.01)
*H04L 1/00* (2006.01)

(52) U.S. Cl.
CPC .............. *H04L 5/006* (2013.01); *H04L 5/0055* (2013.01); *H04L 2001/0093* (2013.01)

(56) References Cited

U.S. PATENT DOCUMENTS

| | | | |
|---|---|---|---|
| 7,133,396 B1 * | 11/2006 | Schmidl et al. | 370/347 |
| 7,343,163 B1 * | 3/2008 | Perkins et al. | 455/452.1 |
| 7,350,125 B2 * | 3/2008 | Jang et al. | 714/748 |
| 7,539,174 B2 * | 5/2009 | Hosaka et al. | 370/349 |
| 7,843,877 B2 * | 11/2010 | Lee et al. | 370/329 |
| 2006/0045032 A1 * | 3/2006 | Hamada | 370/278 |
| 2008/0108380 A1 * | 5/2008 | Tokita | 455/550.1 |
| 2010/0014474 A1 * | 1/2010 | Miki et al. | 370/329 |
| 2010/0226358 A1 * | 9/2010 | Cordeiro | 370/350 |

FOREIGN PATENT DOCUMENTS

| | | |
|---|---|---|
| JP | 2009-537079 A | 10/2009 |
| JP | 2010-279019 A | 12/2010 |
| WO | 2007/091831 A2 | 8/2007 |

OTHER PUBLICATIONS

Search Report and Translation of First Office Action Chinese Patent Application No. 201180069790.3 dated Mar. 21, 2016 with full English translation.

* cited by examiner

FIG.5
FOR TRANSMITTER #1
| TYPE | ADDRESS | TRANSMISSION SOURCE | PRESENT TIME | 1 | TIME SLOT #1 |
FOR TRANSMITTER #2
| TYPE | ADDRESS | TRANSMISSION SOURCE | PRESENT TIME | 1 | TIME SLOT #2 |
FOR TRANSMITTER #3
| TYPE | ADDRESS | TRANSMISSION SOURCE | PRESENT TIME | 1 | TIME SLOT #3 |
EFFECTIVE TERM
FIG.6
(a)
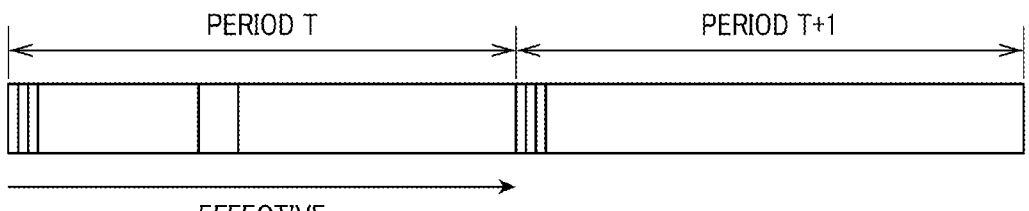
(b)
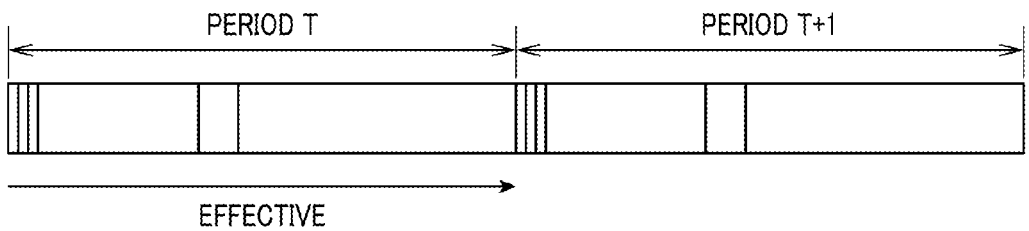

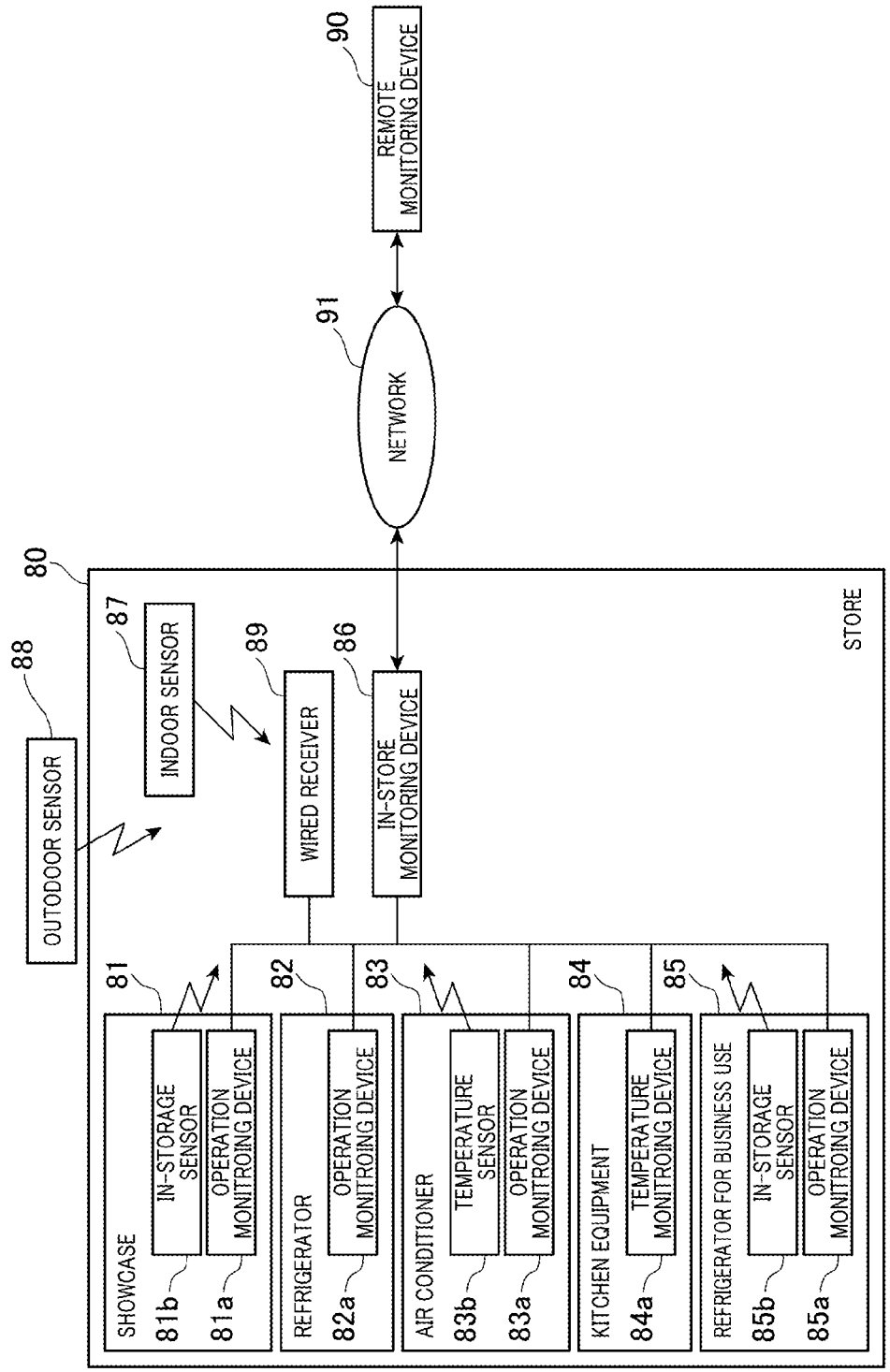

RECEIVER, COMMUNICATION SYSTEM AND IN-STORE EQUIPMENT MONITORING SYSTEM

RELATED APPLICATIONS

This application is the U.S. National Phase under 35 U.S.C. §371 of International Application No. PCT/JP2011/079078, filed on Dec. 15, 2011, which in turn claims the benefit of Japanese Application No. 2011-080863, filed on Mar. 31, 2011, the disclosures of which Applications are incorporated by reference herein.

TECHNICAL FIELD

The present invention relates to a receiver and a communication system for receiving data that are transmitted from plural transmitters and to which real-time performance is required, and an in-store equipment monitoring system in which the communication system is used to monitor equipment installed in a store.

BACKGROUND ART

In communications to which real-time performance is required as in the case of feedback control, etc., communication data are required to be accumulated in some cases. For example, with respect to an in-store equipment monitoring system used in a shopping supermarket or the like, there are requirements that the temperature of equipment such as a refrigerator or the like installed in a store is kept fixed, that the monitoring state of contents in a refrigerator is left as a record, etc. In order to satisfy these requirements, a technique of accurately communication data without losing real-time performance has been known (see Patent Document 1, for example).

The patent document 1 discloses a technique of scheduling re-transmission timing at an interval period without changing a predetermined schedule in a transmitter for intermittently transmitting data on the basis of the predetermined schedule when the data do not normally arrive at a receiver.

PRIOR ART DOCUMENT

Patent Document

Patent Document 1: JP-A-2010-279019

SUMMARY OF THE INVENTION

Problem to be Solved by the Invention

According to the technique disclosed in the Patent Document 1, the transmitter determines the re-transmission timing on the basis of a condition inside the transmitter itself, and thus both of real-time performance and accuracy in data transmission can be satisfied with good balance. However, when communication interruption occurs between a receiver and a transmitter for a long term, re-transmission data may be transmitted to the receiver from plural transmitters all together and conflict with one another when the communication interruption is recovered because the re-transmission timing of the re-transmission data is determined on the basis of the state of each transmitter itself. Therefore, the performance degrades.

The present invention has been implemented to solve the foregoing problem, and has an object to provide a receiver, a communication system and an in-store equipment monitoring system that enable efficient data transmission without losing real-time performance of data transmission for data missing in the middle of communication while occurrence of communication conflict is avoided as much as possible when re-transmission data are transmitted.

Means of Solving the Problem

In order to solve the above problem, according to the present invention, a receiver that is connected to a plurality of transmitters through a communication line, receives, from each of the plurality of transmitters, first data to which real-time performance is required, and transmits an acknowledgement message when the first data is normally received, is characterized by comprising a reception controller that allocates a time slot for transmission of second data transmitted from each of the transmitters according to a reception condition of the first data, and transmits the acknowledgement message corresponding to the first data with the time slot being embedded in the acknowledgement message.

According to the present invention, every reception-success transmitter, the reception controller allocates the time slot for transmission of the second data transmitted from the transmitter on the basis of the re-transmission request message according to the reception condition of the first data, and transmits the acknowledgement message corresponding to the first data with the time slot being embedded in the acknowledgement message. Accordingly, transmission scheduling of second data is performed on the basis of, not information of a single transmitter, but information among plural transmitters at the receiver side, whereby conflict of re-transmission data can be avoided, and thus the scheduling of the re-transmission data can be performed without increasing the communication frequency.

In this invention, the reception controller transmits the acknowledge message corresponding to the first data with not only the time slot, but also an effective term of the time slot being embedded in the acknowledgement message. According to the present invention, the time slot is provided with the effective term, a transmitter which is interrupted to communicate with the receiver after the allocation of the time slot and thus in which the time slot is not updated is prevented from occupying communications over a long term.

In this invention, the reception controller allocates the time slot according to a data amount of the second data accumulated every transmitter succeeding at transmission of the first data. According to the present invention, the accumulation amount of the re-transmission data of the transmitter is finite, and thus the data transmission can be efficiently performed by allocating time slots in accordance with the difference in re-transmission amount.

In this invention, the reception controller allocates the time slot according to a communication condition of each of the transmitters when the receiver is connected to the transmitter. According to the present invention, a larger number of time slots are allocated to a transmitter having a better communication condition, whereby the data transmission can be efficiently performed.

In this invention, the reception controller dynamically allocates the time slot according to an instruction from a superior device that is connected to the receiver through a communication line and takes in the first data and the second data. According to the present invention, the superior device allocates the time slot every transmitter, whereby allocation of time slots can be performed while convenience of a superior device is reflected to the allocation according to a case-by-case condition such as a processing load imposed on the superior device or the like.

According to the present invention, a communication system in which a plurality of transmitters are connected to one receiver through a communication line, is characterized in that each of the transmitters has a transmission controller that transmits, through the communication line to the receiver, first data to which real-time performance is required, and transmits accumulated second data for re-transmission according to a re-transmission request message to be transmitted from the receiver when the first data is not normally transmitted, the receiver has a reception controller that allocates a time slot for transmission of second data transmitted from each of the transmitters on the basis of the re-transmission message according to a reception condition of the first data, and transmits an acknowledgement message to be transmitted when the first data is normally received while the time slot is embedded in the acknowledgement message, and the transmission controller of the transmitter transmits the second data accumulated in the receiver according to the time slot.

According to the present invention, the receiver allocates the time slot for transmission of the second data transmitted from the transmitter on the basis of the re-transmission request message according to the reception condition of the first data every transmitter which succeeds at its reception, and transmits the acknowledgement message corresponding to the first data with the time slot being embedded in the acknowledgement message. Then, the transmitter transmits the re-transmission data according to the time slot at only the period thereof. As described above, the receiver performs the transmission scheduling of the second data on the basis of, not the information of the single transmitter, but also the information among the plural transmitters, whereby the conflict of the re-transmission data can be avoided, and thus there can be provided the communication system that can perform scheduling of re-transmission data without increasing the communication frequency.

In the present invention, an in-store equipment monitoring system that uses the above communication system and monitors equipment installed in a store by a superior device connected to the receiver through a wire or wirelessly, is characterized in that each of the transmitters is driven by a battery, the communication line comprises a wireless sensor network, and the receiver receives the first data or second data as measurement data of the equipment installed in the store from each of the transmitters, and transfers the first data or second data to the superior device to perform adaptive control on the equipment on the basis of a control signal transmitted from the superior device.

According to the present invention, the communication system described above is applied to the in-store equipment monitoring system in which the plural transmitters driven by batteries are connected to the receiver through the wireless sensor network, and the equipment installed in the store is monitored by the superior device. Accordingly, there can be provided the in-store equipment monitoring system in which data transmission can be efficiently performed without losing real-time performance of data transmission for data missing during wireless communication and with avoiding occurrence of communication conflict as much as possible when communication data are accumulated in communications to which real-time performance is required as in the case where the temperature of equipment such as a refrigerator or the like installed in the store 80 is required to be kept fixed or the monitoring state of contents in a refrigerator is required to be left as a history, for example.

Effect of the Invention

According to the present invention, there can be provided the receiver, the communication system and the in-store equipment monitoring system in which occurrence of communication conflict at the transmission time of the re-transmission data can be avoided as much as possible without losing the real-time performance of data transmission with respect to the data missing during the communication, and thus the data transmission can be efficiently performed.

BRIEF DESCRIPTION OF THE DRAWINGS

FIG. 5 is a diagram showing the structure of an acknowledgement message used in the receiver according to the embodiment of the present invention.

FIG. 6 is a diagram showing an example of an effective period set in the time slot shown in FIG. 5.

FIG. 7 is a diagram showing a construction when the communication system according to the embodiment of the present invention of the present invention is applied to an in-store equipment monitoring system.

BEST MODE FOR CARRYING OUT THE INVENTION

An embodiment for carrying out the present invention (hereinafter referred to as this embodiment) will be described in detail with reference to the accompanying drawings.

(Construction of Embodiment)

Figure 1:
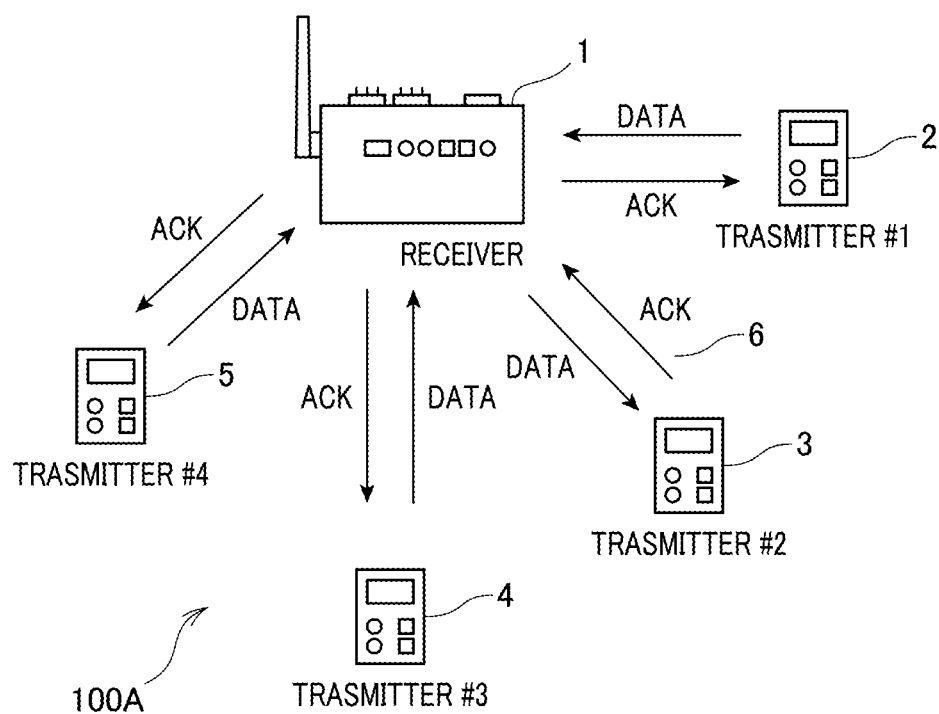
FIG. 1 is a diagram showing the construction of a communication system according to an embodiment of the present invention.

FIG. 1 is a diagram showing the construction of a communication system according to an embodiment. In FIG. 1, a communication system 100A according to the embodiment is constructed by connecting four transmitters #1(2), #2(3), #3(4) and #4(5) to one receiver 1. Each of the transmitters #1(2), #2(3), #3(4) and #4(5) is driven by a battery, and configured to be freely changeable in fixing position and installation position and portable. Therefore, the transmitters #1(2), #2(3), #3(4) and #4(5) measure, at a fixed period (intermittently), physical quantities such as temperature, power, etc. of various kinds of apparatuses such as refrigerators, etc. which are installed in a store and required to be managed in temperature, apparatuses which are required to be managed in power, etc., and transmit the measurement data to (the transmitters #1 (2), #2 (3), #3(4) and #4 (5)) of the devices associated with these apparatuses at a fixed period.

In the construction shown in FIG. 1, a sensor network 6 for physical quantities is constructed so that the measurement data (DATA) measured by the transmitters #1 (2), #2 (3), #3(4) and #4(5) are collected by the receiver 1.

In the sensor network 6, each of the transmitters #1 (2), #2 (3), #3(4) and #4(5) measures physical quantities such as the temperature, power, etc. of the corresponding equipment at a fixed period, and transmits the measurement data to the receiver 1. The receiver 1 receives the respective measurement data (DATA) from the respective transmitters #1 (2), #2 (3), #3(4) and #4 (5). When the measurement data (DATA) are normally received, the receiver 1 transmits an acknowledgement message (ACK), and when the measurement data (DATA) are not normally received, the receiver 1 transmits a re-transmission request message. The communication system 100A according to this embodiment is characterized in that a time slot for transmitting re-transmission data is allocated in the acknowledgement message (ACK), and transmitted to the transmitters #1 (2), #2 (3), #3(4) and #4 (5) as transmission sources. The details will be described hereunder.

Figure 2:
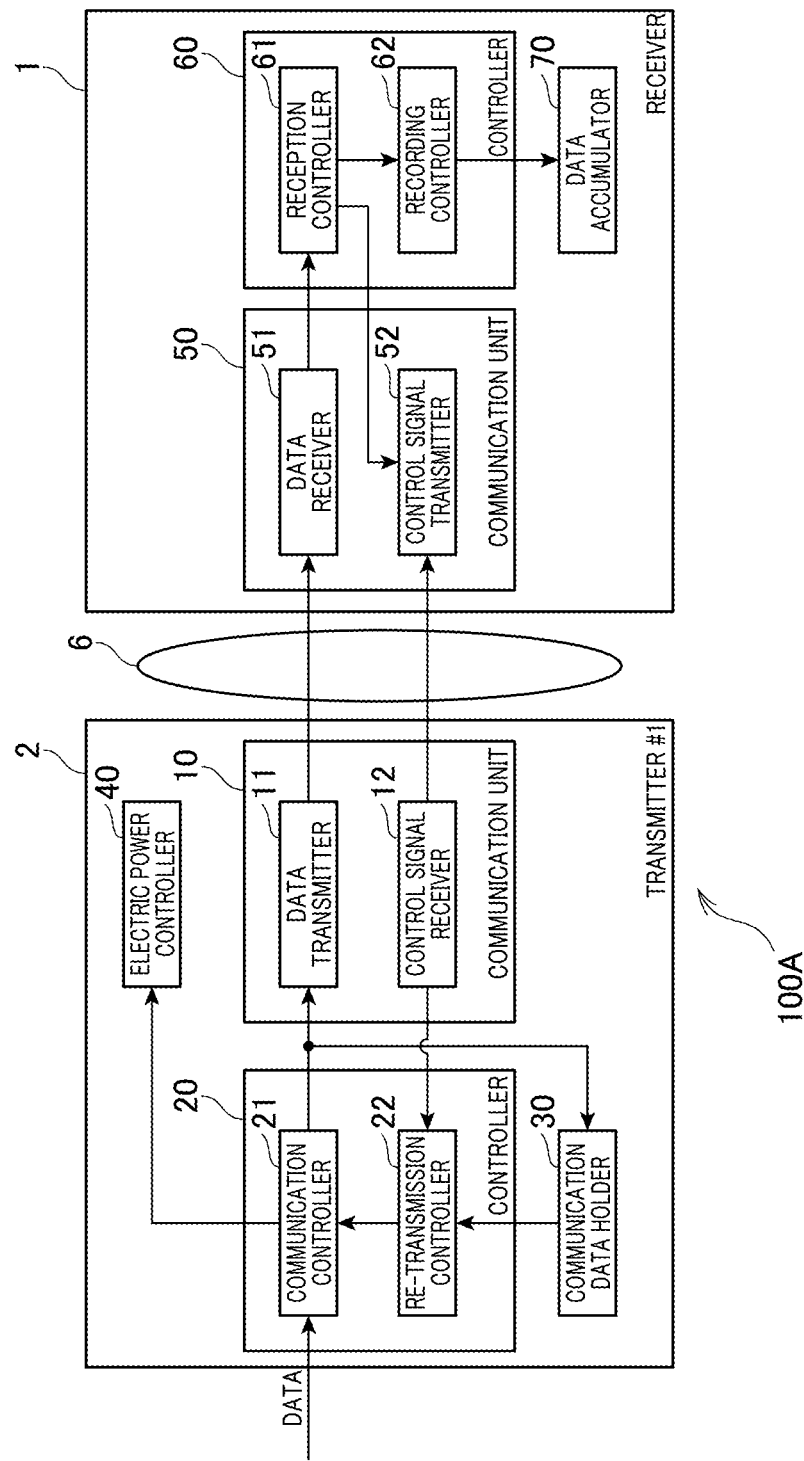
FIG. 2 is a block diagram showing the construction of a transmitter and a receiver constituting the communication system according to the present invention.

FIG. 2 is a block diagram showing the internal constructions of the transmitter #1(2) and the receiver 1 which constitute the communication system 100A according to this embodiment. The transmitters #2(3), #3(4) and #4(5) have the same construction as the transmitter #1(2), and thus only the transmitter #1(2) is shown. The transmitter #1(2) intermittently transmits the measurement data through the sensor network 6 to the receiver 1 according to a predetermined transmission schedule. The receiver 1 receives the measurement data which are intermittently transmitted from the transmitters #1(2), #2(3), #3(4) and #4 (5), and accumulates these measurement data.

The transmitter #1(2) has a communication unit 10, a controller 20, a transmission data storage unit 30 and a power controller 40. The communication unit 10 contains a data transmitter 11 and a control signal receiver 12, and the controller 20 contains a transmission controller 21 and a re-transmission controller 22.

The receiver 1 has a communication unit 50, a controller 60 and a data accumulator 70. The communication unit 50 contains a data receiver 51 and a control signal transmitter 52, and the controller 60 has a reception controller 61 and a recording controller 62.

The hardware configuration of each of the receiver 1 and the transmitter #1(2) may be implemented by any processor, a memory and another LSI, and the software configuration thereof may be implemented by a program or the like loaded into a memory. In the following description, functional blocks implemented by the cooperation of these configurations are illustrated. Accordingly, it is understandable by persons skilled in the art that these functional blocks are implemented in various styles by only the hardware, only the software or the combination of the hardware and the software.

(Operation of Embodiment)

First. the transmitter #1(2) will be described. The transmission controller 21 of the controller 20 obtains data from equipment on a real-time basis, transfers the data to the data transmitter 11 while appending a header to each data, and also accumulates the data into a transmission data holder 30. The header contains a transmission time or a sequence number, whereby the transmission order of the data can be checked at the reception side. The data transmitter 11 intermittently transmits the data transferred from the transmission controller 21 through the sensor network 6 to the data receiver 51. For example, the transmission controller 21 obtains from the equipment temperature data which is measured at an interval of unit time (every 10 seconds, one minute for example), and the data transmitter 11 transmits the obtained data interlockingly with the obtaining timing.

Upon reception of are-transmission instruction from the re-transmission controller 22, the transmission controller 21 obtains the corresponding data from the transmission data holder 30, and transfers the data concerned to the data transmitter 11. The data transmitter 11 re-transmits the re-transmission data transferred from the transmission controller 21 through the sensor network 6 to the receiver 1. The transmission data holder 30 holds the data transmitted from the data transmitter 11. The data held in the transmission data holder 30 are held as backup data for re-transmission. The transmission data holder 30 is constructed by a ring buffer, for example, and when the storage area thereof becomes full, the data are deleted from the oldest data. Furthermore, data to which unnecessity of re-transmission is confirmed may be deleted from the data held in the transmission data holder 30 according to the control of the re-transmission controller 22. The re-transmission controller 22 may determine whether an acknowledgement message (ACK) of data is received or not, thereby determining whether the data concerned is unnecessary to be re-transmitted.

The power controller 40 shifts the data transmitter 11 to a power saving mode (for example, sleep mode) during a period when the data transmitter 11 transmits no data. The power controller 40 may recognize on the basis of a control signal notified from the transmission controller 21 whether the data transmitter 1 is under a transmission period or under a non-transmission period. This power saving control can reduce the power consumption of the transmitter 2. Particularly, this is effective when the rate of the non-transmission period to the transmission period is large.

The control signal receiver 12 receives a control signal from the control signal transmitter 52 in the communication unit 50 of the receiver 1. In this case, the control signal receiver 12 receives an acknowledge message (ACK) and a re-transmission request from the control signal transmitter 52. ACK is a signal returned from the receiver 1 when the data transmitted from the data transmitter 11 is normally received by the receiver 1. The re-transmission request is a signal for requesting re-transmission of data transmitted from the data transmitter 11 by the receiver 1 when the receiver 1 does not normally receive the data concerned. When receiving the re-transmission request from the control signal transmitter 52, the control signal receiver 12 transfers the re-transmission request to the re-transmission controller 22. Accordingly, the re-transmission controller 22 can detect that the data transmitted from the data transmitter 11 does not normally arrive at the receiver 1.

When data transmitted from the data transmitter 11 does not normally arrive at the receiver 1, but the receiver 11 adopts a communication protocol in which the receiver 1 does not output any request for re-transmission of the data, the re-transmission controller 22 can detect in the following manner that the data does not normally arrive. That is, when the re-transmission controller 22 cannot obtain ACK for data transmitted from the data transmitter 11 within a predetermined period after the data are transmitted from the data transmitter 11, there-transmission controller 22 determines that the data concerned does not normally arrive. According to the fact that the data transmitted from the data transmitter 11 does not normally arrive at the receiver 1, the re-transmission controller 22 makes the data transmitter 11 re-transmit the data which has not normally arrived.

Next, the receiver 1 will be described. The data receiver 51 of the communication unit 50 receives the data transmitted from the data transmitter 11 of the transmitter 2, and transfers the data to the reception controller 61 of the controller 60. The data receiver 51 refers to information contained in the header of the data transmitted from the data transmitter 11 to determine whether the data transmitted from the data transmitter 11 can be normally received. More specifically, the data receiver 51 determines whether any error or missing part exists in the data transmitted from the data transmitter 11. For example, the data receiver 51 monitors the sequence number contained in the header to determine whether any missing data exists or not, for example.

When the data transmitted from the data transmitter 11 can be normally received, the reception controller 61 makes the control signal transmitter 52 transmit an acknowledgement message (ACK). On the other hand, when the data transmitted from the data transmitter 11 of the transmitter 2 cannot be normally received, the control signal transmitter 52 makes the control signal transmitter 52 transmit a re-transmission request message for the data which could be normally received. The data accumulator 70 is a recording medium for recording data received by the data receiver 51. The recording controller 62 accumulates the data received by the data receiver 51 into the data accumulator 70. When re-transmission data re-transmitted from the data transmitter 11 is received by the data receiver 51, the recording controller 62 changes the order of the data accumulated in the data accumulator 70 so that the data is managed in a normal order.

Figure 3:
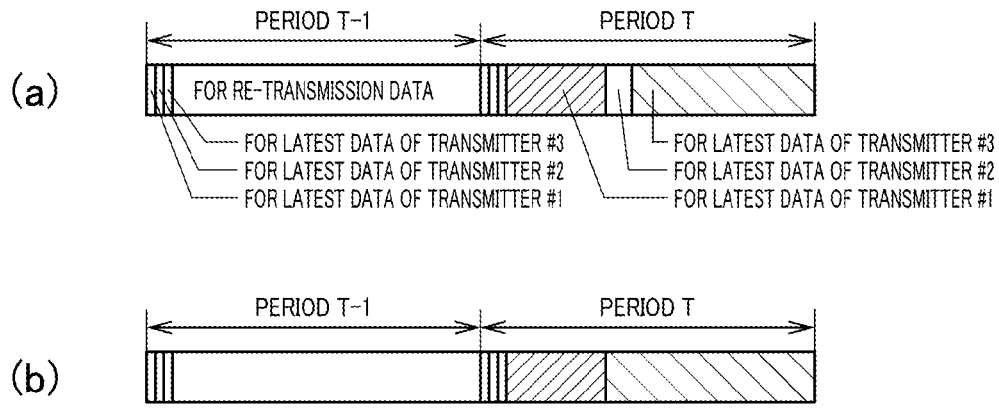
FIG. 3 is a diagram showing a time slot allocating structure of the receiver according to the embodiment of the present invention.

The reception controller 61 allocates a time slot for transmitting re-transmission data transmitted from the data transmitter 11 on the basis of the re-transmission message according to the reception condition in the data receiver 51 of the data transmitted from the data transmitter 11, and transmits the acknowledgement message (ACK) corresponding to the latest data with the time slot being embedded in the acknowledgment message together with information representing the effective term of the time slot. FIG. 3 shows the allocation structure of time slots at this time, and FIG. 5 shows the structure of the acknowledgement message.

Here, it is assumed that the transmitters #1 (2), #2 (3), #3 (4) and #4 (5) are connected to the receiver 1, and the latest data are transmitted in the order from the transmitters #1 (2), #2(3), #3(4) and then #4 (5). When the transmitter #1 (2) transmits the latest data and the receiver 1 receives the data at a period T, the reception controller 61 determines whether the latest data from the transmitters #2(3), #3(4) have been received at the just-before period T−1. The reception controller 61 allocates a time slot for re-transmission data to only any one of the transmitters #1(2), #2(3), #3(4) and #4(5), which has succeeded at transmission of the latest data. As shown in FIG. 5, the time slot and the time information are embedded in the acknowledgement message, and transmitted to the transmitter #1 (2), #2(3), #3(4), #4(5).

FIG. 3(a) is a time slot allocation diagram when all the transmitters #1(2), #2(3), #3(4) and #4(5) succeed at the transmission of the latest data at both the period T−1 and the period T, and FIG. 3(b) is a time slot allocation diagram when all the transmitters #1(2), #2(3), #3(4) and #4(5) succeed at the transmission of the latest data at the period T−1 and the transmitter 2 fails in the transmission of the latest data at the period T. In this case, in order to discriminate real-time performance required data and re-transmission data, the former data (the data to which real-time performance is required) is referred to as latest data.

That is, with respect to a time slot for re-transmission data at the period T of the transmitter n, when the receiver 1 receives the latest data at the period T of the transmitter n (any one of #1(2), #2(3), #3(4) and #4(5)), the reception controller 61 of the receiver 1 allocates a time slot according to the reception condition at that time point, and notifies the allocated time slot to the transmitter n with the acknowledgement message (ACK) corresponding to the latest data. With respect to the re-transmission data amount of the transmitters #1(2), #2(3), #3(4), the transmitters #1(2), #2(3), #3(4) transmit the respective data in order according to a schedule, and thus it can be determined at the reception side what amount of data has been received, so that it is easy to determine the allocation of time slots on the basis of data amounts as re-transmission targets of the respective transmitters #1(2), #2(3), #3(4). Since the re-transmission data retaining amount of the transmitters #1(2), #2(3), #3(4) is finite, the difference in data amount may be set as the difference in allocation amount.

The reception controller 61 may allocate a time slot according to a reception environment when it is connected to the transmitter n in place of the re-transmission data amount. In case of wire connection, the allocation is performed on the basis of the data arrival time, and in case of wireless connection, the allocation is performed on the basis of RSSI (Received Signal Strength Indication). In any case, the reception controller 61 allocates many time slots to a transmitter n having an excellent reception environment at the connection time. A larger number of time slots are allocated according to the re-transmission data amount at a place whose reception environment is chronically bad as compared with a place whose reception environment is good.

Furthermore, in the case of a communication system 100B configured so that data transmitted to the receiver 1 are taken in through a line 8 by a superior device 7 such a central computer or the like, the central controller 7 may dynamically allocate time slots according to its convenience case by case, and transmit the time slots through the line 9 to the respective transmitters #1 (2), #2 (3), #3(4) via the receiver 1.

The acknowledgement message generated by the reception controller 61 comprises "type", "address", "present time", "time slot" and "effective term" as illustrated as a packet addressed to each of the transmitters #1 (2), #2 (3), #3 (4) in FIG. 5. As not shown, a normal measurement data packet comprises "type", "address" "transmission source", "measurement time" and "measurement data".

By adding the effective term to the time slot, for example, by setting the effective term to "1" as shown in FIG. 6 (a), the allocated time slot is set to be effective at only the period T, and further by setting "2" in the time slot as shown in FIG. 6 (b), the allocation of the time slot is set to be effective only during the period T and the subsequent period T+1. Accordingly, the transmitter n which is interrupted to communicate with the receiver 1 after the time slot is allocated and thus the time slot is not updated is prevented from occupying the communication for a long term.

(Effect of the Embodiment)

As described above, according to the receiver 1 of this embodiment, the reception controller 61 allocates a time slot for transmitting second data (re-transmission data) transmitted from the transmitter #1(2), #2(3), #3(4), #4(5) on the basis of the re-transmission request message according to the reception condition of first data (latest data) every transmitter #1(2), #2(3), #3(4), #4(5) from which the reception controller 61 succeeds at data reception, and transmits the time slot while the time slot is embedded in the acknowledgement message (ACK) corresponding to the first data. As described above, transmission scheduling of the second data is performed on the basis of, not information of a single transmitter, but information among the plural transmitters #1(2), #2(3), #3(4) and #4(5), whereby conflict of re-transmission data can be avoided. Accordingly, the scheduling of re-transmission data can be performed without increasing the communication frequency.

Furthermore, according to the receiver 1 of this embodiment, by providing the effective term to the time slot, the transmitter #1(2), #2(3), #3(4), #4(5) which is interrupted to communicate with the receiver 1 after allocation of a time slot and thus for which the time slot is not updated can be prevented from occupying the communication over a longterm. Furthermore, since the accumulation amount of the re-transmission data of the transmitters #1 (2), #2 (3), #3(4) and #4(5) is finite, the time slots are allocated according to the difference in re-transmission data amount, whereby the data transmission can be efficiently performed. Furthermore, for example when the reception environment at the connection time is bad at the transmitter #1 (2), but good at the transmitters #2 (3), #3 (4), #4 (5), lots of time slots are preferentially allocated to the transmitters #2 (3), #3 (4), #4(5) whose reception environments are good, whereby allocation of time slots can be performed while convenience of a superior device is reflected to the allocation according to a case-by-case condition such as a processing load imposed on the superior device or the like.

Furthermore, according to the communication system 100B of this embodiment, the receiver 1 constituting the communication system 100B allocates the time slot for transmitting the second data (re-transmission data) transmitted from the transmitter #1 (2), #2 (3), #3 (4), #4 (5) on the basis of the re-transmission request message according to the reception condition of the first data (latest data) every reception-success transmitter #1 (2), #2 (3), #3 (4), #4 (5), embeds the time slot in the acknowledgement message corresponding to the first data and transmits it. Then, the transmitter #1 (2), #2 (3), #3 (4), #4(5) transmits the re-transmission data according to the time slot received at only the period concerned. As described above, the receiver 1 performs transmission scheduling of the second data, not on the basis of the information of a single transmitter, but on the basis of the information among the plural transmitters #1(2), #2(3), #3(4) and #4(5), whereby the conflict of the re-transmission data can be avoided. Therefore, there can be provided the communication system 100B which enables the scheduling of the re-transmission data without increasing the communication frequency.

According to the communication system 100B of this embodiment, the transmitters #1(2), #2(3), #3(4) and #4(5) are described as the measurement devices (sensors) for periodically measuring temperature and humidity and transmitting the measurement data. However, they may be IP telephones or content distributing devices for transmitting packets containing video data or audio data on a real-time basis. The receiver 1 may be a control device for performing real-time processing (for example, feedback control) based on received data, or an IP telephone or content reproducing device for receiving packets containing video data or audio data on a real-time basis and reproducing them.

(In-store Equipment Monitoring System)

Next, there will be described an embodiment in which the communication system 100B according to this embodiment is applied to an in-store equipment monitoring system 100C for monitoring the temperature, etc. of in-store apparatuses such as a refrigerator, a showcase, etc.

Cooperative control based on networking of plural apparatuses has been important as countermeasures to energy saving and global heating. In this case, in order to optimally control respective apparatuses, it is effective that a central controller located at the center collects information from terminal sensors and performs feedback control on the respective apparatuses. In order to implement such minute energy saving control in a large-scale system, real-time performance is required to a series of processing such as collection of lots of sensing information and feedback control.

Furthermore, when attention is paid to safety of articles centering on "food", it is important to guarantee safety with respect to conditions and environments under storage or transport. In order to guarantee the safety under storage/transport of articles, it is effective to monitor the storage states/transport states of individual articles, environmental information at that time, etc. point by point, and it is effective to leave histories thereof. From the viewpoint of guarantee of safety, accuracy of measurement values and also no "missing" in histories are important to logging data.

In order to implement the energy saving control of many apparatuses such as refrigerators, showcases, etc. in a large-scale store such as a shopping supermarket or the like, it is important to monitor the in-storage temperature of each apparatus and perform feedback control so as to prevent excessive cooling. Furthermore, in order to guarantee in-storage safety, it is necessary to leave the temperature history thereof. Accordingly, both of real-time performance and accuracy are required to collect sensing information.

In order to enhance flexibility of installation for sensors such as temperature sensors, etc., it is preferable to adopt wireless communications. However, when measurement data are wirelessly transmitted, the transmission quality may be degraded due to existence of an obstacle or degradation of a surrounding electric wave condition. In this case, it is difficult to satisfy both of real-time performance and accuracy in transmission of measurement data.

More specifically, when the transmission quality is lowered, a part of measurement data does not arrive at the central controller, and thus it is missing. From the viewpoint that the sensing information is used to control the respective apparatuses, some degree of data lack is acceptable. However, from the viewpoint that the sensing information is accumulated as logging data to guarantee safety, even some degree of data lack is not acceptable. Therefore, when some measurement data is missing during transmission, it may be considered to perform re-transmission control. However, there is a risk that delay occurs due to re-transmission control processing and propagates to the transmission of subsequent measurement data, resulting in damage of real-time performance of monitoring and feedback. Under an environment in which the electrical wave condition is unstable, this delay may be accumulated, so that monitoring and feedback would become insignificant.

FIG. 7 is a diagram showing the construction when the communication system according to this embodiment is applied to the in-store equipment monitoring system 100C. In this case, apparatuses installed in a store 80 contain a refrigerating showcase and a freezing showcase in which selling foods are stored (they are hereinafter generally referred to as a showcase 81), a refrigerating machine 82, an air conditioner 84 for air-conditioning a food selling floor, etc., a refrigerator 85 for business use which is placed at a kitchen, illuminating equipment, etc.

The showcase 81, the refrigerating machine 82, the air conditioner 83, the kitchen equipment and the refrigerator 85 for business use are provided with operation monitoring devices 81a, 82a, 83a, 84a and 85a, respectively. These operation monitoring devices are connected through wires to an in-store managing device 86 which is installed to manage the whole store 80.

The showcase 81 is also provided with an in-storage sensor 81b for detecting the temperature of a food storage chamber, the refrigerator 85 for business use is provided with an in-storage sensor 85b for detecting the temperature of a food storage chamber, and the air conditioner 83 is provided with a temperature sensor 83b for detecting air suction temperature. An indoor sensor 87 for detecting the temperature at a proper place in the store 80 and an outdoor sensor 88 for detecting the outdoor air of the store 80 are provided to control the operation of the air conditioner 83.

Each of the in-storage sensors 81b, 85b, the temperature sensor 83b, the indoor sensor 87 and the outdoor sensor 88 contains a temperature detecting circuit and a transmission/reception circuit for transmitting/receiving data. Each of the in-storage sensors 81b, 85b, the temperature sensor 81a, the indoor sensor 87 and the outdoor sensor 88 is individually provided with a battery, and configured so that the temperature detecting circuit, the transmission/reception circuit, etc. thereof are operated by using the battery as a driving source. The batteries are used as the driving sources by these devices because the batteries can be secured at freely selected places.

The store 80 is provided with a wireless receiver 89 concomitantly with the in-store monitoring device 86 or in association with the in-store monitoring device 86. Each of the in-storage sensors 81b, 85b, the temperature sensor 83b, the indoor sensor 87 and the outdoor sensor 88 measures the temperature at a set fixed period (intermittently operates), and transmits the measurement data of the measured temperature to the wireless receiver 89 at a fixed period (intermittently operates).

When receiving the measurement data of the temperature from the in-storage sensors 81b, 85b, the temperature sensor 83b, the indoor sensor 87 and the outdoor sensor 88, the wireless transceiver 89 transmits an acknowledgement message (ACK) to the in-storage sensors 81b, 85b, the temperature sensor 83b, the indoor sensor 87 and the outdoor sensor 88 which have transmitted the measurement data. In this case, for example, the present time based on RTC (Real Time Clock) of the wireless receiver 89 shown in FIGS. 3 and 5, a time slot for re-transmission data and information concerning the effective term of the time slot are embedded in the acknowledgement message (ACK), and transmitted from the wireless receiver 89 to the in-storage sensors 81b, 85b, the temperature sensor 83b, the indoor sensor 87 and the outdoor sensor 88. The in-storage sensors 81b, 85b, the temperature sensor 83b, the indoor sensor 87 and the outdoor sensor 88 perform clock synchronization of RTC on the basis of the received time data, and re-transmits the data according to the time slot and the effective term information.

Figure 4:
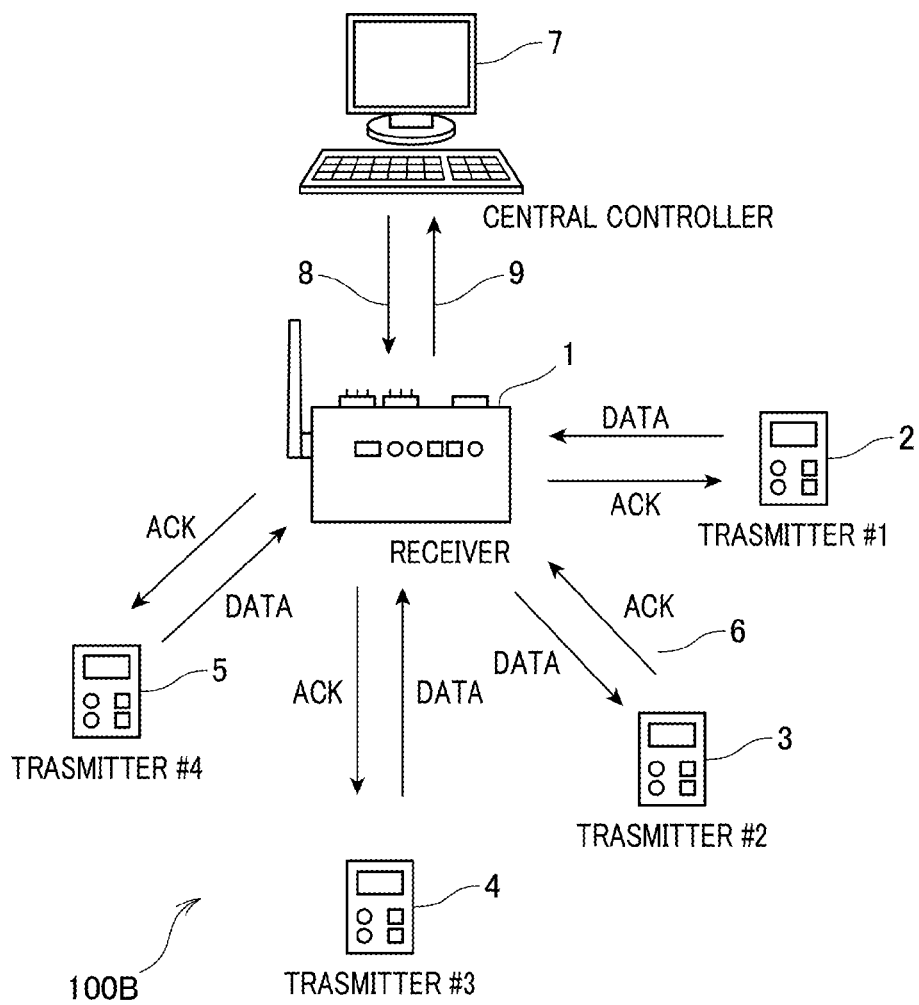
FIG. 4 is a diagram showing another example of the construction of the communication system according to the embodiment of the present invention.

Since the operation as described above is performed, the in-storage sensors 81b, 85b, the temperature sensor 83b, the indoor sensor 87 and the outdoor sensor 88 correspond to the transmitters 2, 3, 4 shown in FIGS. 1 and 4, the refrigerator 8 for business use and the air conditioner 9 corresponds to the apparatuses 3 shown in FIGS. 1 and 2, and the wireless receiver 89 corresponds to the receiver 1.

According to the above construction, since the wireless receiver 89 is connected to the in-store monitoring device 86 through a wire, the wireless receiver 89 receives the measurement data and controls the operation of the operation monitoring devices 81a, 82a, 83a and the temperature monitoring device 84 according to a predetermined program. In the showcase 81, the operation monitoring device 81a is controlled on the basis of the comparison between measurement data from the in-storage sensor 81b and set data so that the in-storage temperature of the showcase 81 is equal to set temperature. Furthermore, in the refrigerator 85 for business use, the operation monitoring device 85a is controlled on the basis of the comparison between measurement data from the in-storage sensor 85b and set data so that the in-storage temperature of the refrigerator 85 for business use is equal to set temperature. Furthermore, in the air conditioner 83, the operation monitoring device 83a is controlled on the basis of the comparison between measurement data from the temperature sensor 83b and set data so that the temperature in the store 80 is equal to set temperature by the air conditioner 83.

In the illuminating equipment (not shown), the operation monitoring device is controlled on the basis of the comparison between measurement data from a detector for power consumption and set data so that the illuminance of the illuminating equipment is equal to set illuminance.

The in-store monitoring device 86 is connected to a remote monitoring device 90 in a center controller room distant from the store 80 via a network 91 such as an IP (Internet Protocol) network or the like, and transmits received measurement data to the remote monitoring device 90 at a predetermined timing. The remote monitoring device 90 stores or uses these measurement data to control the store monitoring device 86 so that the store 80 is excellently operated.

The communication system 100B according to this embodiment is applied to the in-store equipment monitoring system 100C in which the plural transmitters (the sensor group 81b, 83b, 85b, 87, 88 in FIG. 7) driven by the batteries are connected to the receiver (wireless receiver 89) through the wireless sensor network, and the apparatuses 81, 82, 83, 84, 85 installed in the store 80 are monitored by the superior device (the in-store monitoring device 86, the remote monitoring device 90). Accordingly, there can be provided the in-store equipment monitoring system 100c in which data transmission can be efficiently performed without losing real-time performance of data transmission for data missing during wireless communication and with avoiding occurrence of communication conflict as much as possible when re-transmission data are transmitted in a case where communication data are accumulated in communications to which real-time performance is required as in the case where the temperature of equipment such as a refrigerator or the like installed in the store 80 is required to be kept fixed or the monitoring state of contents in a refrigerator is required to be left as a history, for example.

The embodiment has been described above, and it is needless to say that the technical scope of the present invention is not limited to the range of the embodiment. It is obvious to persons skilled in the art that various alterations or improvements can be applied to the above embodiment, and it is apparent from the scope of claims that embodiments to which these alterations or improvements are applied are contained in the technical scope of the present invention.

DESCRIPTION OF REFERENCE NUMERALS

1 . . . receiver, 2 . . . transmitter #1, 3 . . . transmitter #2, 4 . . . transmitter #3, 5 . . . transmitter #4, 6 . . . sensor network, 7 . . . superior device (central controller), 10 . . . communication unit, 11 . . . data transmitter, 12 . . . control signal receiver, 20 . . . controller, 21 . . . transmission controller, 22 . . . re-transmission controller, 30 . . . transmission data holder, 40 . . . power controller, 50 . . . communication unit, 51 . . . data receiver, 52 . . . control signal transmitter, 60 . . . controller, 61 . . . reception controller, 62 . . . recording controller, 70 . . . data accumulator, 100A, 100B . . . communication system, 100C . . . in-store equipment monitoring system

The invention claimed is:

1. A receiver that is connected to a plurality of transmitters through a communication line, receives, from each of the plurality of transmitters, first data to which real-time performance is required, and transmits an acknowledgement message when the first data is normally received, the receiver comprising a reception controller that allocates a time slot for transmission of second data transmitted from each of the transmitters to all of the transmitters and sets a different allocation time amount of the time slot for each of the transmitters according to a reception condition of the first data, and transmits the acknowledgement message corresponding to the first data with the time slot being embedded in the acknowledgement message, wherein the reception controller sets the different allocation time amount of the time slot according to a data amount of the second data accumulated every transmitter succeeding at transmission of the first data.

2. The receiver according to claim 1, wherein the reception controller transmits the acknowledge message corresponding to the first data with not only the time slot, but also an effective term of the time slot being embedded in the acknowledgement message.

3. The receiver according to claim 1, wherein the different allocation time amount of the time slot is allocated according to a communication condition of each of the transmitters when the receiver is connected to the transmitter.

4. The receiver according to claim 1, wherein the reception controller dynamically allocates the time slot according to an instruction from a superior device that is connected to the receiver through a communication line and takes in the first data and the second data.

5. A communication system comprising:
a plurality of transmitters; and
one receiver that is connected to the plurality of transmitters through a communication line,
wherein each of the transmitters has a transmission controller that transmits, through the communication line to the receiver, first data to which real-time performance is required, and transmits accumulated second data for re-transmission according to a re-transmission request message to be transmitted from the receiver when the first data is not normally transmitted, the receiver has a reception controller that allocates a time slot for transmission of second data transmitted from each of the transmitters to all of the transmitters and sets a different allocation time amount of the time slot for each of the transmitters according to a reception condition of the first data, and transmits an acknowledgement message to be transmitted when the first data is normally received while the time slot is embedded in the acknowledgement message, and the transmission controller of the transmitter transmits the second data accumulated in the receiver according to the time slot, wherein the reception controller sets the different allocation time amount of the time slot according to a data amount of the second data accumulated every transmitter succeeding at transmission of the first data.

6. An in-store equipment monitoring system that uses the communication system according to claim 5 and monitors equipment installed in a store by a superior device connected to the receiver through a wire or wirelessly, characterized in that each of the transmitters is driven by a battery, the communication line comprises a wireless sensor network, and the receiver receives the first data or second data as measurement data of the equipment installed in the store from each of the transmitters, and transfers the first data or second data to the superior device to perform adaptive control on the equipment on the basis of a control signal transmitted from the superior device.

* * * * *